United States Patent
Wu et al.

(10) Patent No.: US 10,957,084 B2
(45) Date of Patent: Mar. 23, 2021

(54) IMAGE PROCESSING METHOD AND APPARATUS BASED ON AUGMENTED REALITY, AND COMPUTER READABLE STORAGE MEDIUM

(71) Applicant: Baidu Online Network Technology (Beijing) Co., Ltd, Beijing (CN)

(72) Inventors: Zhongqin Wu, Beijing (CN); Yingchao Li, Beijing (CN); Chen Zhao, Beijing (CN); Nan Wei, Beijing (CN); Qian Ying, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 16/110,859

(22) Filed: Aug. 23, 2018

(65) Prior Publication Data
US 2019/0147632 A1    May 16, 2019

(30) Foreign Application Priority Data
Nov. 13, 2017  (CN) .......................... 201711121488.3

(51) Int. Cl.
G09G 5/00       (2006.01)
G06T 11/60      (2006.01)
G06T 7/194      (2017.01)
G06T 7/11       (2017.01)
G06N 20/00      (2019.01)

(52) U.S. Cl.
CPC .............. *G06T 11/60* (2013.01); *G06N 20/00* (2019.01); *G06T 7/11* (2017.01); *G06T 7/194* (2017.01); *G06T 2210/32* (2013.01)

(58) Field of Classification Search
None
See application file for complete search history.

(56) References Cited

U.S. PATENT DOCUMENTS

| 9,224,100 | B1* | 12/2015 | Chatterjee | .......... | G06Q 30/0241 |
| 9,922,437 | B1* | 3/2018 | Baron | ....................... | G06T 11/60 |
| 10,192,115 | B1* | 1/2019 | Sheffield | ................. | G06N 20/00 |
| 10,713,794 | B1* | 7/2020 | He | ......................... | G06N 3/0454 |

(Continued)

FOREIGN PATENT DOCUMENTS

| CN | 102866871 A | 1/2013 |
| CN | 103679204 A | 3/2014 |

(Continued)

*Primary Examiner* — Anh-Tuan V Nguyen
(74) *Attorney, Agent, or Firm* — Akerman LLP (57) ABSTRACT

The present disclosure provides an image processing method. The method includes: detecting at least one first feature object of an image to be processed, to obtain a name and position of each first feature object in the image; according to the name and position of the first feature object, and a preset strategy for loading a dynamic effect, selecting, from the at least one first feature object, a feature object to which a dynamic effect is to be loaded, as a second feature object; and according to the preset strategy for loading a dynamic effect, rendering the second feature object with an Augmented Reality (AR) dynamic effect, and obtaining an image with the AR dynamic effect. The present disclosure further provides an image processing apparatus, a device and a computer readable storage medium.

12 Claims, 2 Drawing Sheets

(56) References Cited

U.S. PATENT DOCUMENTS

| | | | | |
|---|---|---|---|---|
| 2003/0052906 | A1* | 3/2003 | Lau | G06F 3/0481 715/700 |
| 2004/0077393 | A1* | 4/2004 | Kim | A63F 13/10 463/2 |
| 2007/0146389 | A1* | 6/2007 | Distler | G06T 11/60 345/629 |
| 2009/0109240 | A1* | 4/2009 | Englert | G06T 19/006 345/633 |
| 2011/0157179 | A1 | 6/2011 | Fahn et al. | |
| 2012/0113142 | A1* | 5/2012 | Adhikari | G06Q 30/0623 345/633 |
| 2013/0342568 | A1* | 12/2013 | Ambrus | G06T 19/006 345/633 |
| 2014/0043321 | A1* | 2/2014 | Matjasko | G06T 15/00 345/419 |
| 2014/0184644 | A1* | 7/2014 | Sharma | G06F 3/017 345/633 |
| 2017/0236001 | A1* | 8/2017 | McLean | G06T 11/00 345/620 |
| 2017/0257594 | A1* | 9/2017 | Goslin | G06T 19/006 |
| 2017/0365098 | A1* | 12/2017 | Auten | G06F 3/011 |
| 2017/0372165 | A1* | 12/2017 | Jouhikainen | G06K 9/4609 |
| 2018/0039479 | A1* | 2/2018 | Fransen | G06F 3/167 |
| 2018/0053333 | A1* | 2/2018 | Carr | G06T 13/80 |
| 2018/0060701 | A1* | 3/2018 | Krishnamurthy | G06K 9/6269 |
| 2018/0082460 | A1* | 3/2018 | Xing | G06T 13/80 |
| 2018/0150713 | A1* | 5/2018 | Farooqi | G06N 20/00 |
| 2018/0190033 | A1* | 7/2018 | Barnett | G06K 9/66 |
| 2018/0232608 | A1* | 8/2018 | Pradeep | G06N 5/047 |
| 2018/0247111 | A1* | 8/2018 | Tomlinson | G06K 9/00248 |
| 2018/0300916 | A1* | 10/2018 | Barnett | G06Q 50/01 |
| 2018/0322908 | A1* | 11/2018 | Kim | G11B 27/036 |
| 2018/0341811 | A1* | 11/2018 | Bendale | G06T 7/593 |
| 2019/0102646 | A1* | 4/2019 | Redmon | G06K 9/4652 |
| 2019/0325653 | A1* | 10/2019 | Yip | G06F 3/04847 |

FOREIGN PATENT DOCUMENTS

| | | |
|---|---|---|
| CN | 103606310 B | 1/2016 |
| CN | 105430211 A | 3/2016 |
| CN | 106127166 A | 11/2016 |
| CN | 106790470 A | 5/2017 |
| CN | 106934849 A | 7/2017 |
| CN | 107247548 A | 10/2017 |

* cited by examiner

IMAGE PROCESSING METHOD AND APPARATUS BASED ON AUGMENTED REALITY, AND COMPUTER READABLE STORAGE MEDIUM

The present application claims the benefit of priority to Chinese patent application No. 201711121488.3, filed before the State Intellectual Property Office on Nov. 13, 2017, and entitled "An image processing method and apparatus, a device and a computer readable storage medium", which is incorporated in the present application by reference in its entirety.

FIELD OF THE DISCLOSURE

The present disclosure relates to the technical field of image editing and processing, and particularly to an image processing method and apparatus, a device and a computer readable storage medium.

BACKGROUND OF THE DISCLOSURE

An image, as a conventional medium type, is applied in a very wide range. As compared with text, an image is more vivid, provides more visual experience and can be wide spread. However, as compared with a rich media such as video and animation, an image is characterized in that:

(1) the image is stationary, expresses little information, and cannot exhibit continuously-changing content due to being displayed in a limited dimension, for example, it cannot exhibit a bowl of steaming noodle or a long-haired fair lady;

(2) the image is obtained with a relatively lower cost and an ordinary device, and occupies a low bandwidth.

Therefore, currently the image is still a main medium for spreading information to the public, and is still prevailing. However, the limited displaying dimension is the largest drawback of the image, failing to satisfy users' requirements for information with high richness. How to improve the displaying dimension of an image to enhance the richness thereof with maintaining the low cost of the image is a technical problem urgently to be solved.

SUMMARY OF THE DISCLOSURE

Embodiments of the present disclosure provide an image processing method and apparatus, a device and a computer readable storage medium, to at least solve one or more of the above technical problems in the related art.

In a first aspect, embodiments of the present disclosure provide an image processing method, including:

detecting at least one first feature object of an image to be processed, to obtain a name and position of each first feature object in the image;

according to the name and position of the first feature object, and a preset strategy for loading a dynamic effect, selecting, from the at least one first feature object, a feature object to which a dynamic effect is to be loaded, as a second feature object; and according to the preset strategy for loading a dynamic effect, rendering the second feature object with an AR dynamic effect, and obtaining an image with the AR dynamic effect.

In combination with the first aspect, in a first implementation of the first aspect of the present disclosure, the step of, according to the preset strategy for loading a dynamic effect, rendering the second feature object with an AR dynamic effect includes:

segmenting the second feature object to obtain a foreground portion to which the AR dynamic effect to be loaded and a background portion to be remaining unchanged; and according to the preset strategy for loading a dynamic effect, rendering the foreground portion with the AR dynamic effect.

In combination with the first implementation of the first aspect, in a second implementation of the first aspect of the present disclosure, the rendering the foreground portion with the AR dynamic effect includes:

converting the foreground portion into a masking-out portion;

according to the name and position of the second feature object corresponding to the foreground portion, selecting, from a dynamic effect material library, a dynamic effect material matching the second feature object; and displaying overlappingly the selected dynamic effect material and the masking-out portion.

In combination with the first aspect, the first implementation of the first aspect and the second implementation of the first aspect, in a third implementation of the first aspect of the present disclosure, after obtaining an image with the AR dynamic effect, the method further includes:

remaining a storage format of the image unchanged in a case that an instruction of saving the image is not received; and saving the image with the AR dynamic effect in a dynamic image format in a case that the instruction of saving the image is received.

In combination with the first aspect, the first implementation of the first aspect and the second implementation of the first aspect, in a fourth implementation of the first aspect of the present disclosure, after obtaining the image with the AR dynamic effect, the method further includes:

obtaining an operation of a user to the image with the AR dynamic effect, and optimizing the strategy for loading a dynamic effect by learning according to the operation.

In a second aspect, embodiments of the present disclosure provide an image processing apparatus, including:

a feature object detecting unit configured to detect at least one first feature object of an image to be processed, to obtain a name and position of each first feature object in the image;

a feature object selecting unit configured to, according to the name and position of the first feature object, and a preset strategy for loading a dynamic effect, select, from the at least one first feature object, a feature object to which a dynamic effect is to be loaded, as a second feature object; and a dynamic effect loading unit configured to, according to the preset strategy for loading a dynamic effect, render the second feature object with an AR dynamic effect, and obtain an image with the AR dynamic effect.

In combination with the second aspect, in a first implementation of the second aspect of the present disclosure, the dynamic effect loading unit includes:

a segmenting module configured to, segment the second feature object to obtain a foreground portion to which the AR dynamic effect to be loaded and a background portion to be remaining unchanged; and a rendering module configured to, according to the preset strategy for loading a dynamic effect, render the foreground portion with the AR dynamic effect.

In combination with the first implementation of the second aspect, in a second implementation of the second aspect of the present disclosure, the rendering module includes:

a converting sub-module configured to convert the foreground portion into a masking-out portion;

a selecting sub-module configured to, according to the name and position of the second feature object corresponding to the foreground portion, select, from a dynamic effect material library, a dynamic effect material; and an overlapping display sub-module configured to display overlappingly the selected dynamic effect material and the masking-out portion.

In combination with the second aspect, the first implementation of the second aspect and the second implementation of the second aspect, in a third implementation of the second aspect of the present disclosure, the image processing apparatus further includes:

a format processing unit configured to:

remain a storage format of the image unchanged in a case that an instruction of saving the image is not received; and save the image with the AR dynamic effect in a dynamic image format in a case that the instruction of saving the image is received.

In combination with the second aspect, the first implementation of the second aspect and the second implementation of the second aspect, in a fourth implementation of the second aspect of the present disclosure, the image processing apparatus further includes:

a strategy optimizing unit configured to obtain an operation of a user to the image with the AR dynamic effect, and optimize the strategy for loading a dynamic effect by learning according to the operation.

Functions of the above units may be implemented through hardware, or implementing by hardware executing corresponding software. The hardware or software includes one or more units corresponding to the above functions.

In a possible design, the structure of the image processing apparatus includes a processor and a memory, the memory being used to store a program of supporting the image processing apparatus to execute the image processing method in the abovementioned first aspect, the processor being configured to execute the program stored in the memory. The image processing apparatus may further include a communication interface configured to enable the image processing apparatus to communicate with other devices or communication networks.

In a third aspect, embodiments of the present disclosure provide a computer readable storage medium configured to store computer software instruction used by the image processing apparatus, including a program which is used to execute the image processing method in the aforesaid first aspect and involved by the image processing apparatus.

The above technical solutions in some embodiments at least provide the following advantages or advantageous effects:

improve the displaying dimension of an image and the richness of the image with maintaining a low cost;

automatically adding a dynamic effect to the image without excessive manual intervention; allowing loading of the dynamic effect to be more in conformity with a user's habits and preferences by improving the strategy by learning.

The above summary is only intended for description purpose, not to limit in any manner. In addition to illustrative aspects, implementation modes and features described above, further aspects, implementation modes and features of the present disclosure will be made apparent by referring to drawings and the following detailed depictions.

BRIEF DESCRIPTION OF DRAWINGS

In the figures, unless otherwise specified, reference numbers throughout a plurality of figures represent the same or similar components or elements. These figures are not certainly drawn by scale. It should be appreciated that these figures only depict some embodiments according to the present disclosure, and should not be considered as limiting the scope of the present disclosure.

DETAILED DESCRIPTION OF PREFERRED EMBODIMENTS

The following text only simply describes some exemplary embodiments. As recognized by those skilled in the art, it is possible to modify the described embodiments in various different manners without departing from the spirit or scope of the present disclosure. Hence, the figures and depictions are considered as being substantially exemplary not restrictive.

To improve the dimension of exhibiting information of an image to improve the richness thereof with maintaining the low cost of the image, in embodiments of the present disclosure, it is desired to combine Artificial Intelligence (AI) and Augmented Reality (AR) technologies and provide an image processing method and apparatus, a device and a computer readable medium, to obtain a technical solution of automatically adding a dynamic effect to an image without excessive manual intervention. The method and apparatus, the device and the computer readable medium will be described in detail in the following embodiments.

Embodiment 1

Figure 1:
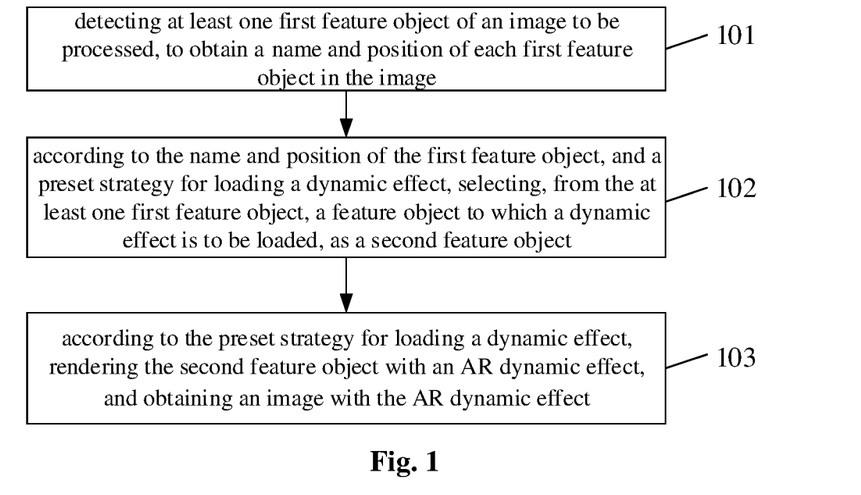
FIG. 1 is a schematic flow chart of an image processing method according to an embodiment of the present disclosure.

An image processing method is provided by Embodiment 1 of the present disclosure. The method may be implemented on a terminal device of a user, and may also be implemented at a server or on the cloud. In addition, the image, as an operation object in embodiments of the present disclosure, may be stored either on the terminal device or the server or the cloud so long as it is ready to be obtained upon the image processing being performed. No excessive limitations are made herein. As shown in FIG. 1, the method according to Embodiment 1 of the present disclosure mainly includes the following steps:

Step 101: detecting at least one first feature object of an image to be processed, to obtain a name and position of each first feature object in the image.

As stated above, if the image to be processed is stored locally at the user terminal, the image is obtained locally at the user terminal. If the image to be processed is stored at a server, the image is obtained from the server. If the image to be processed is stored at the cloud, the image is obtained from an image storage space of the cloud. In one word, if an entity on which the method according to an embodiment of the present disclosure is executed is the same as the entity in which the image is stored, the image is directly obtained locally; if an entity on which the method according to an embodiment of the present disclosure is executed is different from the entity in which the image is stored, it is required to obtain the image from the entity in which it is stored.

In step 101, detecting at least one first feature object of the image to be processed may be performed based on an image recognition technology, for example, an image recognition technology based on pixel analysis, an image recognition technology based on deep learning, and so on. In the embodiment of the present disclosure, the specific type and limitation of the image recognition technology is not limited. In a practical application, any image recognition technology that can be used to detect a feature object of an image as required by the embodiment of the present disclosure should fall within the protection scope of the embodiment of the present disclosure. The image recognition technology also serves as a part of the AI technology of the embodiment of the present disclosure.

The feature object which is briefly referred to as a first feature object in the image is recognized based on an image recognition technology, to obtain a name and a position thereof. The position of the first feature object may be described in a coordinate range of a pixel point or in other forms, which is not limited in the embodiments of the present disclosure. Any form for describing the position that may be used for achieving the objective of present disclosure should fall within the protection scope of the embodiment of the present disclosure.

The first feature objects stated in the embodiment of the present disclosure may have different names, for example, sky, sea, cup, vegetable, grassland, lake surface, cartoon figure, cartoon expression, stage, square, road, character, animal and goods. The name of the first feature object is not limited to the above examples, and many other names may be used in practical application, which cannot be exhausted in the embodiment of the present disclosure.

Obtaining the name of the first feature object is performed to clarify the type of the feature object in the image, and obtaining the position of the first feature object is performed to facilitate subsequent rendering with a dynamic effect.

Step 102: according to the name and position of the first feature object, and a preset strategy for loading a dynamic effect, selecting, from the at least one first feature object, a feature object to which a dynamic effect is to be loaded, as a second feature object.

The strategy for loading a dynamic effect in the embodiment of the present disclosure is a strategy which may be constantly optimized based on automatic learning of a machine. The strategy initially may be configured manually, but subsequently, may be constantly optimized and improved by learning through big data analysis (including recording and analyzing users' operations). The strategy for loading a dynamic effect at least includes the type of the feature object to which a dynamic effect is to be loaded and that of the dynamic effect to be loaded to the feature object, or at least includes the type and position of the feature object to which a dynamic effect is to be loaded and that of the dynamic effect to be loaded to the feature object. The dynamic effect materials may be constantly enriched and increased, and may be increased either manually or automatically increased by grasping.

In practical application, it is usually to perform rendering with an AR dynamic effect to part of the image, i.e., to perform rendering with an AR dynamic effect only to a portion of the first feature object. For example, for a landscape image including water and mountain, only the water-related portion therein is rendered with a dynamic effect so that water in the part of the image seems to be flowing. It is also possible to perform rendering with an AR dynamic effect to the whole image, that is, to perform rendering with an AR dynamic effect to all of the first feature objects. In embodiments of the present disclosure, a case of performing rendering with an AR dynamic effect to the whole image is allowed. The portion of the first feature object to which a dynamic effect is to be loaded may be determined depending on the strategy for loading a dynamic effect. For example, according to a strategy for loading a dynamic effect that a dynamic effect should be loaded to a water-related part in a landscape image which includes mountain and water, in a case that the first feature objects in the image is recognized by performing step 101 include a mountain and a water-related portion, only the water-related portion is selected from the first feature objects by performing step 102 as a second feature object, that is, a feature object to which a dynamic effect is to be loaded. The strategy for loading a dynamic effect in the embodiment of the present disclosure is an AI-based dynamic strategy, and it is updated and improved constantly by learning based on operations executed by users to various policies, thus being dynamically changing and non-stationary. For example, an operation of giving a like, saving and sharing of an image with a dynamic effect indicates that the user accepts the corresponding part of a strategy for loading a dynamic effect, otherwise it indicates that the user does not accept the corresponding part of a strategy for loading a dynamic effect. In this case, the accepted part may be retained and improved, and unaccepted parts may be modified or be even abandoned.

In addition, the obtaining the name and position of a first feature object may include obtaining the classification of the image. For example, images are generally classified into the following classifications:

a scenery image: an image in which there is the sky, the sea, a cup, vegetable, grassland, lake surface and so on;

a cartoon image: an image in which there is a cartoon figure, a cartoon expression and so on;

a construction image: an image in which there is a stage, a square, an urban road and so on;

a person/article image: an image in which there is a movable object such as a person, an animal, and goods.

Classifications of images are not limited to the stated ones, and cannot not be listed one by one in the embodiments of the present disclosure. The classification of an image may also be used as a strategy for loading a dynamic effect, so as to determine the second feature object to which a dynamic effect is to be loaded. For example, for a scenery image, the scenery in the image, as the second feature object, a dynamic effect may be loaded thereto. For a cartoon image, a dynamic effect may be loaded to a cartoon figure or a cartoon expression in the image. For a construction image, a dynamic effect may not be loaded to a building in the image. For a person/article image, a dynamic effect may be loaded to a person in the image. There may be various strategies, and only a few examples are provided in the embodiments of the present disclosure. In addition to the classification of an image, for the strategy of loading a dynamic effect, more factors may also be considered, for example, the position, size and a color parameter of a second feature object. Therefore, a dynamic effect material to be loaded to the image may be determined by considering various factors.

Step 103: according to the preset strategy for loading a dynamic effect, rendering the second feature object with an AR dynamic effect, and obtaining an image with the AR dynamic effect.

Figure 2:
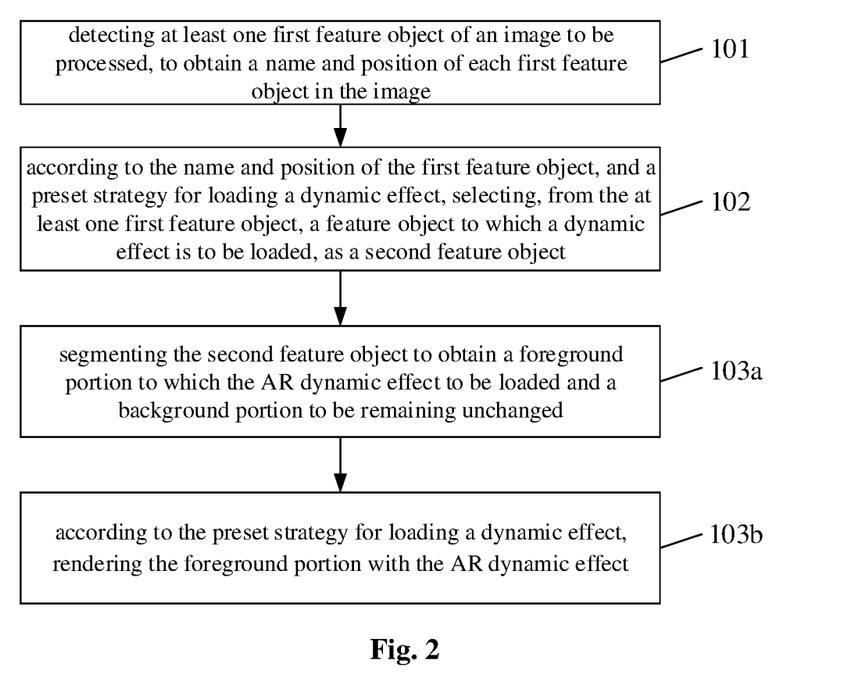
FIG. 2 is a schematic flow chart of another image processing method according to an embodiment of the present disclosure.

As shown in FIG. 2, step 103 may specifically include:

Step 103a: based on the position of the second feature object in the image, segmenting the second feature object to obtain a foreground portion to which the AR dynamic effect to be loaded and a background portion to be remaining unchanged, namely, separating the foreground portion from the background portion of the image.

Step 103b: according to the preset strategy for loading a dynamic effect, rendering the foreground portion with the AR dynamic effect, namely, rendering the foreground portion without changing the background portion.

Rendering the foreground portion with the AR dynamic effect may include:

converting the foreground portion into a masking-out portion;

according to the name and position of the second feature object corresponding to the foreground portion, selecting, from a dynamic effect material library, a dynamic effect material (the criteria and rules for selecting have been already illustrated in step 102, and will not be detailed any more herein);

displaying overlappingly the selected dynamic effect material and the masking-out portion.

By using the masking-out portion, it is possible to only render the corresponding foreground portion without affecting the remaining part of the image. Any existing technology may be used for converting the foreground portion into the mask-out portion, and not detailed any more herein. After displaying the overlapping portion, the obtained image exhibits the dynamic effect. If there are a plurality of (at least two) second feature objects to which a dynamic effect is to be loaded in the same image according to the strategy for loading a dynamic effect, it is possible to load a dynamic effect to the second feature objects respectively, and then perform the overlapping respectively.

Types of loadable dynamic effects according to the embodiments of the present disclosure include but not limited to:

A. a dynamic effect in which a person/article in the image is displayed in a three-dimensional manner, so that the image seems like a 3D image;

B. a dynamic effect in which illumination is enhanced, the position or brightness of a light source, or a dynamic shadow is adjusted;

C. a weather-related effect, such as a dynamic effect related to the wind, rain, thunder, hail, rainbow and the like;

D. an environment-related effect, such as a dynamic effect related to the cloud, a sea wave, ground cracking, volcano eruption and so on;

E. a particle effect, such as a dynamic effect related to heat, flame, lamp light/sunlight, explosion and so on;

F. an article/person-related effect, such as a dynamic effect related to a dinosaur, a whale, a lotus flower, a butterfly, an airplane crash, a movie and TV IP, a star figure and so on;

G. style rendering, a dynamic effect related to cartoon, art, a back-and-white old image and so on.

Only some commonly-used dynamic effects are listed above, and dynamic effects cannot be exhausted in the embodiments of the present disclosure. Furthermore, dynamic effect materials can be updated and expanded constantly. Dynamic effect materials may be stored in a specific storage space for obtaining by the strategy for loading a dynamic effect.

In addition, in an implementation, after the image with the AR dynamic effect is obtained, the method according to the embodiment of the present disclosure may further include:

remaining a storage format of the image unchanged in a case that an instruction of saving the image is not received; and saving the image with the AR dynamic effect in a dynamic image format in a case that the instruction of saving the image is received.

That is to say, before the instruction of saving the image is received, the dynamic effect is only loaded on the image and the image exhibits the dynamic effect when displayed. However, the image with the dynamic effect is not saved at this time. Only if the user conducts an instruction of saving the image with the dynamic effect and the instruction is received, the image will be saved. Accordingly, the storage format of the image is required to be changed, i.e., a storage format of the original static image is changed into a storage format of a dynamic image, for example, gif, mp4 and the like. As such, it is possible to save the storage space (the storage space of the user terminal or server, or cloud), and only store the image that the user instructs to store. Furthermore, the instruction of saving the image may be conducted by many ways, including but not limited to an operation of saving, forwarding, and sharing.

In another implementation mode, after the image with the AR dynamic effect is obtained, the method according to the embodiment of the present disclosure may further include:

obtaining an operation of a user to the image with the AR dynamic effect, and optimizing the strategy for loading a dynamic effect by learning according to the operation.

As stated above, the strategy for loading a dynamic effect according to the embodiment of the present disclosure is an AI technology-based strategy, and it is updated and improved constantly by learning from the users' operations for various strategies, which is changed dynamically and not stationary. For example, an operation of giving a like, saving or sharing for an image with a certain dynamic effect indicates that the user accepts the corresponding strategy for loading a dynamic effect, otherwise indicates that the user does not accept the corresponding strategy for loading a dynamic effect. The accepted part of the strategy may be retained and improved, and unaccepted part may be modified or even abandoned. That is to say, the strategy for loading a dynamic effect is constantly improved and updated by constantly learning from the user s' operations with respect to the image with a dynamic effect. In a specific implementation, it is possible to constantly update the strategy for loading a dynamic effect by learning with respect to an individual user according to the user's operations. It is also possible to, without distinguishing users from each other, constantly update and improve a general strategy for loading a dynamic effect for all users by learning from a lot of operations of all users.

In addition, in the embodiment of the present disclosure, it is possible to, in addition to load a dynamic effect, load other effects such as sound effect to the image to enable the image to become more vivid and interesting.

It is possible to, with the technical solution of Embodiment 1 of the present disclosure, enlarge the dimensions of displaying an image and improve the richness of the image with maintaining the low cost. It is also possible to automatically add a dynamic effect to the image without excessive manual intervention, and constantly improve the strategy for loading a dynamic effect by learning to allow the dynamic effect loaded to better comply with the user's habits and preferences.

It is noted that the embodiment of the present disclosure may be applied to a scenario of using an image in a user terminal, including but not limited to the mobile phone album, cloud storage APP, album management APP, and image social sharing APP.

The method according to the embodiment of the present disclosure may be implemented on the user's terminal device, and may also be implemented on a server or the cloud. In addition, the image, as the operation object in embodiments of the present disclosure may be stored either on the user terminal or the server or the cloud so long as it can be conveniently obtained upon image processing, which is not further limited herein. If an implementing entity for implementing the embodiment of the present disclosure is the same entity as a storage entity of the image, the image is directly obtained from the local. If the implementing entity for implementing the embodiment of the present disclosure and the storage entity of the image are different entities, the implementing entity may obtain the image from the storage entity. It is necessary for the implementing entity and the storage entity to interact with each other.

In addition, in a specific implementation of the embodiment of the present disclosure, the method may be configured as a specific application mode of the user terminal, which may be briefly called an AR effect mode. When the user's operation triggers the user terminal to enter the AR effect mode, the method of the embodiment of the present disclosure is implemented.

Furthermore, an engine for rendering an AR dynamic effect in the embodiment of the present disclosure may be a function module. A uniform input and output interface may be provided for each module. Output of any module may be regarded as input of next module. As such, all modules can be optionally organized and combined according to algorithm requirements, and facilitate to achieve of cloud organization of an engine module, enabling to provide a hot update and dynamic expansion function.

Embodiment 2

Figure 3:
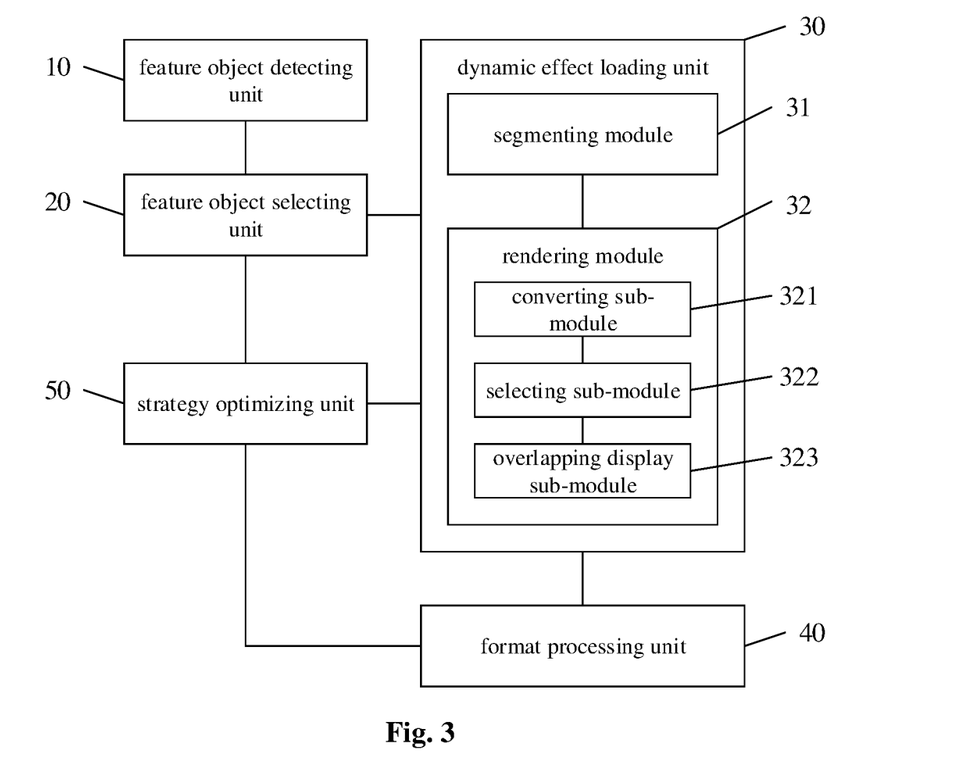
FIG. 3 is a schematic diagram of components of an image processing apparatus according to an embodiment of the present disclosure.

Corresponding to the image processing method of Embodiment 1 of the present disclosure, Embodiment 2 of the present disclosure further provides an image processing apparatus. As shown in FIG. 3, the apparatus includes:

a feature object detecting unit 10 configured to detect at least one first feature object of an image to be processed, to obtain a name and position of each first feature object in the image;

a feature object selecting unit 20 configured to, according to the name and position of the first feature object, and a preset strategy for loading a dynamic effect, select, from the at least one first feature object, a feature object to which a dynamic effect is to be loaded, as a second feature object; and a dynamic effect loading unit 30 configured to, according to the preset strategy for loading a dynamic effect, render the second feature object with an AR dynamic effect, and obtain an image with the AR dynamic effect.

In an implementation, the dynamic effect loading unit 30 includes:

a segmenting module 31 configured to, segment the second feature object to obtain a foreground portion to which the AR dynamic effect to be loaded and a background portion to be remaining unchanged; and a rendering module 32 configured to, according to the preset strategy for loading a dynamic effect, render the foreground portion with the AR dynamic effect.

In an implementation, the rendering module 32 includes:
a converting sub-module 321 configured to convert the foreground portion into a masking-out portion;

a selecting sub-module 322 configured to, according to the name and position of the second feature object corresponding to the foreground portion, select, from a dynamic effect material library, a dynamic effect material corresponding to the second feature object; and an overlapping display sub-module 323 configured to display overlappingly the selected dynamic effect material and the masking-out portion.

In an implementation, the image processing apparatus further includes:

a format processing unit 40 which is connected to the dynamic effect loading unit 30 and configured to:

remain a storage format of the image unchanged in a case that an instruction of saving the image is not received; and save the image with the AR dynamic effect in a dynamic image format in a case that the instruction of saving the image is received.

In an implementation, the image processing apparatus further includes:

a strategy optimizing unit 50 which is connected to the feature object selecting unit 20, the dynamic effect loading unit 30 and the format processing unit 40, and configured to obtain an operation of a user to the image with the AR dynamic effect, and optimize the strategy for loading a dynamic effect by learning according to the operation.

In practical application, the image processing apparatus according to Embodiment 2 of the present disclosure may be arranged on the user terminal, or on the server or the cloud. The image to be processed by the image processing apparatus may be stored at the local of the user terminal, or stored on the server side, or may be stored on the cloud.

It is possible to, with the technical solution of Embodiment 2 of the present disclosure, enlarge the dimensions of displaying an image and improve the richness of the image with maintaining the low cost. It is also possible to automatically add a dynamic effect to the image without excessive manual intervention, and constantly improve the strategy for loading a dynamic effect by learning to allow the dynamic effect loaded to better comply with the user's habits and preferences.

Embodiment 3

Figure 4:
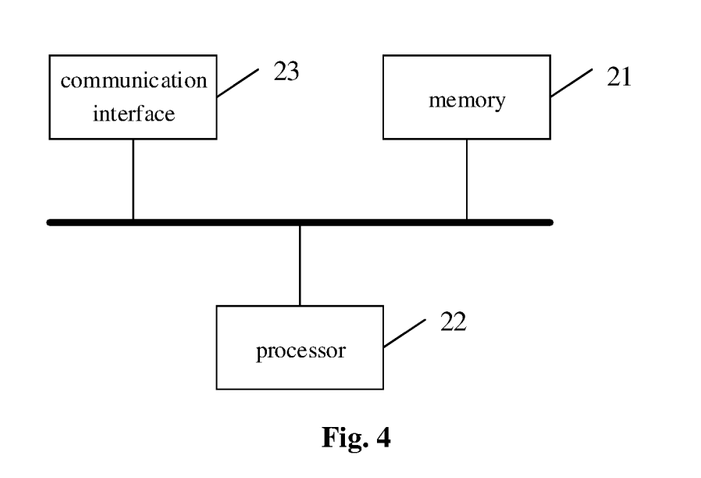
FIG. 4 is a schematic diagram of components of an image processing apparatus according to an embodiment of the present disclosure.

Corresponding to the image processing method of Embodiment 1 of the present disclosure and the image processing apparatus of Embodiment 2 of the present disclosure, Embodiment 3 of the present disclosure provides an image processing apparatus. As shown in FIG. 4, the apparatus includes: a memory 21 and a processor 22, a computer program runnable on the processor 22 being stored in the memory 21. The processor 22 implements the image processing method described in the above embodiment upon executing the computer program. The number of the memory 21 and processor 22 may be one or more.

The apparatus further includes:
a communication interface 23 configured to enable communication between the memory 21 and the processor 22.

The memory 21 may include a high-speed RAM memory, or may further include a non-volatile memory, for example at least one magnetic disk memory.

If the memory 21, the processor 22 and the communication interface 23 are implemented separately, the memory 21, processor 22 and communication interface 23 may be interconnected via a bus and complete intercommunication. The bus may be an Industry Standard Architecture (ISA) bus, a Peripheral Component Interconnect (PCI) bus or an Extended Industry Standard Component (EISA) bus. The bus may be classified into address bus, data bus, control bus and so on. For ease of illustration, the bus is represented with only one thick line in FIG. 4, but this does not mean that there is only one bus or one type of buses.

Optionally, upon specific implementation, if the memory 21, processor 22 and communication interface 23 are integrated on one chip, the memory 21, processor 22 and communication interface 23 may complete intercommunication via an internal interface.

In practical application, the image processing apparatus according to Embodiment 3 of the present disclosure may be deployed on the user terminal side, or deployed on the server side or cloud. The image to be processed by the image processing apparatus may be stored at the local of the user terminal, or stored on the server side, or certainly may be stored on the cloud.

In the depictions of the description, reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Furthermore, the described specific features, structures, materials, or characteristics may be combined in any suitable manner in one or more embodiments or examples. In addition, in the case of no mutual contradiction, those skilled in the art may incorporate or combine different embodiments or examples and features of different embodiments or examples described in the description.

In addition, terms "first" and "second" are only used for illustration purpose and cannot be understood as indicating or implying relative importance or implicitly indicating the number of the meant technical features. Hence, a feature defined by "first" and "second" may explicitly or implicitly indicate that at least one said feature is included. In the depictions of the present disclosure, "a plurality of" means two or more, unless otherwise definitely and specifically defined.

Any procedure or method described in the flow charts or described in any other way herein may be understood to include one or more modules, portions or parts for storing executable codes that realize particular logic functions or procedures. Moreover, the scope of preferred embodiments of the present disclosure includes other implementations in which the order of execution is different from that which is depicted or discussed, including executing functions in a substantially simultaneous manner or in an opposite order according to the related functions. This should be understood by those skilled in the art which embodiments of the present disclosure belong to.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system including processors or other systems capable of obtaining the instruction from the instruction execution system, device and equipment and executing the instruction), or to be used in combination with the instruction execution system, device and equipment. As to the specification, "the computer readable medium" may be any device adapted for including, storing, communicating, propagating or transferring programs to be used by or in combination with the instruction execution system, device or equipment.

In embodiments of the present disclosure, the computer readable medium may be a computer readable signal medium or a computer readable storage medium or any combination of the two. More specific examples (non-exhaustive pages) of the computer readable storage medium include: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable storage medium may even be a paper or other appropriate medium capable of printing programs thereon, this is because, for example, the paper or other appropriate medium may be optically scanned and then edited, decrypted or processed in other appropriate manners when necessary to obtain the programs in an electric manner, and then the programs may be stored in the computer memories.

In embodiments of the present disclosure, the computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, input method or device or a combination thereof. The program codes included by the computer-readable medium may be transmitted with any suitable medium, including, but not limited to radio, electric wire, optical cable, radio frequency (RF) or the like, or any suitable combination thereof.

It should be appreciated that each part of the present disclosure may be realized by the hardware, software, firmware or their combinations. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function for a data signal, an application-specific integrated circuit having an appropriate combination logic gate circuit, a programmable gate array (PGA), a field programmable gate array (FPGA), etc.

It should be understood by those skilled in the art that all or part of the steps in the method of the above embodiments can be implemented by instructing related hardware via programs, the program may be stored in a computer readable storage medium, and the program includes one step or combinations of the steps of the method when the program is executed.

In addition, function cells of the embodiments of the present disclosure may be integrated in a processing module, or these cells may be separate physical existence, or two or more cells are integrated in a module. The integrated module may be realized in a form of hardware or in a form of a software function module. When the integrated module is realized in a form of the software function module and is sold or used as a standalone product, the integrated module may be stored in a computer readable storage medium. The storage medium stated here may be a read only memory, a magnetic disk, an optical disk or the like.

What are described above are only specific implementation modes of the present disclosure, but the extent of protection of the present disclosure is not limited to this. Without departing from the technical scope revealed by the present disclosure, those skilled in the art can readily envisage various variations or substitutes, which are all covered by the extent of protection of the present disclosure. Hence, the extent of protection of the present disclosure should be subject to the protection scope of the appended claims.

What is claimed is:

1. An image processing method, wherein the method comprises:
    detecting at least one first feature object of an image to be processed, to obtain a name, a type and a position of each first feature object in the image;
    according to the name and the position of the first feature object, and a determined strategy for loading a dynamic effect, selecting, from the at least one first feature object, a feature object to which a dynamic effect is to be loaded, as a second feature object; and
    according to the determined strategy for loading a dynamic effect, rendering the second feature object with an augmented reality (AR) dynamic effect, and obtaining an image with the second feature object rendered by the AR dynamic effect,
    wherein the determined strategy for loading a dynamic effect uses the classification of the image as a basis for determining the second feature object to which a dynamic effect is to be loaded;
    the determined strategy for loading a dynamic effect is constantly optimized and dynamically changing based on automatic learning of a machine, wherein after obtaining the image with the AR dynamic effect, the method further comprises obtaining an operation of a user to the image with the AR dynamic effect, and optimizing the strategy for loading a dynamic effect by learning according to the operation.

2. The method according to claim 1, wherein according to the determined preset strategy for loading a dynamic effect, rendering the second feature object with an AR dynamic effect comprises:
    segmenting the second feature object to obtain a foreground portion to which the AR dynamic effect to be loaded and a background portion to be remaining unchanged; and
    according to the determined preset strategy for loading a dynamic effect, rendering the foreground portion with the AR dynamic effect.

3. The method according to claim 2, wherein rendering the foreground portion with the AR dynamic effect comprises:
    converting the foreground portion into a masking-out portion;
    according to the name and the position of the second feature object corresponding to the foreground portion, selecting, from a dynamic effect material library, a dynamic effect material matching the second feature object; and
    displaying overlappingly the selected dynamic effect material and the masking-out portion.

4. The method according to claim 1, wherein after obtaining an image with the AR dynamic effect, the method further comprises:
    remaining a storage format of the image unchanged in a case that an instruction of saving the image is not received; and
    saving the image with the AR dynamic effect in a dynamic image format in a case that the instruction of saving the image is received.

5. An image processing apparatus, wherein the apparatus comprises:
    one or more processors; and
    a storage device configured for storing one or more programs, wherein
    the one or more programs are executed by the one or more processors to enable the one or more processors to:
    detect at least one first feature object of an image to be processed, to obtain a name and position of each first feature object in the image;
    according to the name and the position of the first feature object, and a determined strategy for loading a dynamic effect, select, from the at least one first feature object, a feature object to which a dynamic effect is to be loaded, as a second feature object; and
    according to the determined strategy for loading a dynamic effect, render the second feature object with an augmented reality (AR) dynamic effect, and obtain an image with the second feature object rendered by the AR dynamic effect,
    wherein the determined strategy for loading a dynamic effect uses the classification of the image as a basis for determining the second feature object to which a dynamic effect is to be loaded;
    the determined strategy for loading a dynamic effect is constantly optimized and dynamically changing based on automatic learning of a machine, wherein the one or more programs are executed by the one or more processors to enable the one or more processors further to obtain an operation of a user to the image with the AR dynamic effect, and optimize the strategy for loading a dynamic effect by learning according to the operation.

6. The apparatus according to claim 5, wherein the one or more programs are executed by the one or more processors to enable the one or more processors further to:
    segment the second feature object to obtain a foreground portion to which the AR dynamic effect to be loaded and a background portion to be remaining unchanged; and
    a rendering module configured to, according to the determined strategy for loading a dynamic effect, render the foreground portion with the AR dynamic effect.

7. The apparatus according to claim 6, wherein the one or more programs are executed by the one or more processors to enable the one or more processors further to:
    convert the foreground portion into a masking-out portion;
    according to the name and the position of the second feature object corresponding to the foreground portion, select, from a dynamic effect material library, a dynamic effect material matching the second feature object; and
    display overlappingly the selected dynamic effect material and the masking-out portion.

8. The apparatus according to claim 5, wherein the one or more programs are executed by the one or more processors to enable the one or more processors further to:
    remain a storage format of the image unchanged in a case that an instruction of saving the image is not received; and
    save the image with the AR dynamic effect in a dynamic image format in a case that the instruction of saving the image is received.

9. A non-volatile computer readable storage medium in which a computer program is stored, wherein the computer program, when executed by a processor, causes the processor to perform operations comprising:
   detecting at least one first feature object of an image to be processed, to obtain a name, a type and a position of each first feature object in the image;
   according to the name and the position of the first feature object, and a determined strategy for loading a dynamic effect, selecting, from the at least one first feature object, a feature object to which a dynamic effect is to be loaded, as a second feature object; and
   according to the determined strategy for loading a dynamic effect, rendering the second feature object with an augmented reality (AR) dynamic effect, and obtaining an image with the second feature object rendered by the AR dynamic effect-,
   wherein the determined strategy for loading a dynamic effect uses the classification of the image as a basis for determining the second feature object to which a dynamic effect is to be loaded;
   the determined strategy for loading a dynamic effect is constantly optimized and dynamically changing based on automatic learning of a machine, wherein the computer executable instructions, when executed by a processor, cause the processor to perform further operations comprising obtaining an operation of a user to the image with the AR dynamic effect, and optimizing the strategy for loading a dynamic effect by learning according to the operation.

10. The non-volatile computer-readable storage medium of claim 9, wherein the computer executable instructions, when executed by a processor, causes the processor to perform further operations comprising:
   segmenting the second feature object to obtain a foreground portion to which the AR dynamic effect to be loaded and a background portion to be remaining unchanged; and
   according to the determined strategy for loading a dynamic effect, rendering the foreground portion with the AR dynamic effect.

11. The non-volatile computer-readable storage medium of claim 10, wherein the computer executable instructions, when executed by a processor, causes the processor to perform further operations comprising:
   converting the foreground portion into a masking-out portion;
   according to the name and the position of the second feature object corresponding to the foreground portion, selecting, from a dynamic effect material library, a dynamic effect material matching the second feature object; and
   displaying overlappingly the selected dynamic effect material and the masking-out portion.

12. The non-volatile computer-readable storage medium of claim 9, wherein the computer executable instructions, when executed by a processor, cause the processor to perform further operations comprising:
   remaining a storage format of the image unchanged in a case that an instruction of saving the image is not received; and
   saving the image with the AR dynamic effect in a dynamic image format in a case that the instruction of saving the image is received.

* * * * *